United States Patent
Matherne, Sr.

(10) Patent No.: US 7,246,731 B1
(45) Date of Patent: Jul. 24, 2007

(54) TRANSPORT RACK

(76) Inventor: Bernard A. Matherne, Sr., 121 Ferry Dr., Brandon, MS (US) 39047

( * ) Notice: Subject to any disclaimer, the term of this patent is extended or adjusted under 35 U.S.C. 154(b) by 309 days.

(21) Appl. No.: 10/638,830

(22) Filed: Aug. 11, 2003

(51) Int. Cl.
*B60R 9/00* (2006.01)
*B60P 3/06* (2006.01)

(52) U.S. Cl. .......................... 224/403; 224/536; 410/7

(58) Field of Classification Search ............... 224/402, 224/403, 517, 536, 543, 557, 570, 404, 405, 224/924; 211/4, 5, 6, 7, 8, 64; 410/4, 7
See application file for complete search history.

(56) References Cited

U.S. PATENT DOCUMENTS

| | | |
|---|---|---|
| 2,697,631 A | 12/1954 | Miller |
| 3,891,262 A | 6/1975 | Brunel |
| 3,912,139 A | 10/1975 | Bowman |
| 4,126,228 A * | 11/1978 | Bala et al. ...................... 211/5 |
| 4,852,779 A | 8/1989 | Berg |
| 5,476,200 A * | 12/1995 | Wong .......................... 224/405 |
| 5,516,020 A * | 5/1996 | Lawler et al. ............... 224/405 |
| 5,556,064 A * | 9/1996 | Cowe ........................... 248/172 |
| 5,593,260 A | 1/1997 | Zimmerman |
| 5,676,257 A * | 10/1997 | Adkins ........................... 211/4 |
| 6,036,417 A | 3/2000 | Weaver |
| 6,050,737 A | 4/2000 | Russell |
| 6,059,496 A | 5/2000 | Stevens |
| 6,086,298 A | 7/2000 | Fanuele et al. |
| 6,099,219 A | 8/2000 | Bartholomay |
| 6,161,996 A | 12/2000 | Bartlett |
| 6,173,842 B1 * | 1/2001 | Fitzgerald ....................... 211/4 |
| 6,179,181 B1 | 1/2001 | Johnson et al. |
| 6,450,472 B1 * | 9/2002 | Cook, Jr. ..................... 248/551 |
| 6,505,764 B2 | 1/2003 | Vining |
| 6,619,485 B1 * | 9/2003 | Jenkins .......................... 211/4 |
| 6,786,373 B2 * | 9/2004 | Pierce et al. ................. 224/501 |
| 6,834,786 B2 * | 12/2004 | Hansen ........................ 224/403 |
| 7,147,415 B2 * | 12/2006 | Rorie et al. ..................... 410/7 |
| 2002/0092881 A1 | 7/2002 | Lambert |

* cited by examiner

*Primary Examiner*—Nathan J. Newhouse
*Assistant Examiner*—Justin M. Larson
(74) *Attorney, Agent, or Firm*—Kenneth M. Bush; Bush IP Law Group, LLC (57) ABSTRACT

The present invention provides a transport rack for use in securing cargo in a transport vehicle. The transport rack preferably comprises a frame assembly mounted to a support surface at a lower end of a pair of telescoping legs, and to opposing sidewalls at the distal end of a pair of telescoping arms. The transport rack further comprises a clamping assembly mounted to the frame assembly, wherein the clamping assembly has a rotatable shaft, at least two hook members mounted to the shaft for rotation between an open position and a clamped position, and a fixed arm member mounted subjacent each of the at least two hook members. The present invention further comprises means for selectively changing the height of the clamping assembly above the support surface, and means for selectively varying the distance between the hook members. The present invention may also comprise a hand lever operatively mounted to the shaft, a pair of opposing sleeves positioned to form an aligned channel for receiving a pin when the clamping assembly is in a clamped position, and means for locking the clamping assembly in a clamped position.

25 Claims, 7 Drawing Sheets

TRANSPORT RACK

FIELD OF THE INVENTION

The present invention relates to the field of transport racks for use in for securing cargo to the bed of a transport vehicle such as a pickup truck, trailer, or the like. More specifically, the present invention relates to a transport rack for use in hauling all terrain vehicles (ATV), lawn mowers, tractors, generators, or other cargo on the bed of a transport vehicle.

BACKGROUND OF THE INVENTION

Various rack systems are known for securing objects on truck beds, trailer beds and the like. However, the rack systems known in the prior art have significant limitations. For instance, in most cases the rack systems are designed for use in securing only a particular type of vehicle, such as an all terrain vehicle (ATV) or snowmobile, or only a particular type of equipment such as a lawnmower or generator. Utilizing these rack systems known in the prior art to secure cargo having a wide variety of shapes is either a cumbersome process or not possible at all. While the prior art devices fulfill their particular objectives, none provide a transport rack as disclosed herein. The present invention addresses the need for a transport rack that may be reliably and easily utilized to secure vehicles and equipment having a wide variety of shapes.

From the foregoing it may be seen that heretofore, no one has adequately provided a transport rack for use in securing cargo of various shapes and sizes onto the bed of a pickup truck or trailer. A need exists for a transport rack that is easy to use and that overcomes the limitations of the prior art rack systems, thereby encouraging the use of the transport rack to safely and conveniently transport cargo on the bed of a pickup truck or trailer.

SUMMARY OF THE PRESENT INVENTION

It is an object of the present invention to provide a transport rack that overcomes the limitations of the prior art.

Another object of the present invention is to provide a transport rack for securing cargo to the support surface of a transporting conveyance such as a pickup truck, trailer, or the like.

Another object of the invention is to provide a transport rack that may be reliably and easily operated to secure and immobilize cargo to the bed of a pickup truck or trailer.

A further object of the present invention is to provide a transport rack that is adaptable to permit securing cargo of various sizes; and to permit mounting of the transport rack onto truck beds of various sizes.

A still further object of the present invention is to provide a transport rack having means for locking to deter the theft of cargo secured in the transport rack.

An additional object of the present invention is to provide a transport rack that is of simple, durable construction amenable to lost cost manufacture.

These and other objects of the present invention are accomplished through the use of a transport rack comprising a frame assembly mounted at a lower end of a pair of telescoping legs to the flooring surface of a transporting conveyance. Where the transporting conveyance has opposing sidewalls, such as a conventional pickup truck, the frame assembly may also be mounted to opposing sidewalls at the distal end of a pair of telescoping arms. The transport rack further comprises a clamping assembly mounted to the frame assembly, wherein the clamping assembly has a rotatable shaft, at least two hook members mounted to the shaft, and a fixed arm member mounted subjacent each of the at least two hook members.

The present invention has a hand lever operatively mounted to the shaft for use in manually rotating the shaft and the hook members between an open position and a clamped position. The hook members and subjacent extension members are adapted for securing a portion of the cargo therebetween, or alternatively a holding bar fixedly attached to the cargo, when the clamping assembly is in the clamped position.

The present invention provides a transport rack that may be readily reconfigured to allow the transport rack to be used with cargos of various shapes. For instance, various means are provided for selectively changing the height of the clamping assembly above the support surface, as well as means for selectively varying the distance between the hook members. This allows the transport rack to accommodate cargos having various configurations, including those which engage the clamping assembly at different heights above the support surface.

The present invention provides an apparatus for securing cargo that is easy to operate. Placing the clamping assembly of the present invention in the clamped position secures cargo to allow for its safe transportation on a transport vehicle. The present invention is further provided with a pair of opposing sleeves positioned to form an aligned channel for receiving a pin when the clamping assembly is in a clamped position, which assists in securing the cargo. Further, the present invention provides means for locking the clamping assembly in a clamped position, to provide protection against theft of the cargo secured by the transport rack.

These and other objects and advantages of the invention will become apparent from the following detailed description of the preferred embodiment of the invention.

BRIEF DESCRIPTION OF THE DRAWINGS

A transport rack embodying features of the invention is described in the accompanying drawings which form a portion of this disclosure and wherein.

DESCRIPTION OF THE PREFERRED EMBODIMENT

Referring to FIGS. 1-11 for a clearer understanding of the invention, it may be seen that the present invention provides a transport rack 12 for use in securing cargo 10 to the bed 11 of a transport vehicle, such as but not limited to a pickup truck or trailer. The cargo 10 may be any material or equipment suitable for transporting in the bed 11 of a truck or trailer, such as for example an all terrain vehicle (ATV), lawn mower, tractor, or generator.

The transport rack 12 of the present invention comprises a frame assembly 14 having a lower end mounted to the floor support surface 11a of a bed 11 of a transport vehicle. In some instances, the bed 11 of a transport vehicle may be further provided with a pair of opposing sidewalls 11b, such as those of a conventional pickup truck. The present invention further comprises a clamping assembly 16 mounted to the frame assembly 14 for use in securing cargo thereto. As shown with reference to FIG. 1, the clamping assembly 16 of the present invention comprises a shaft 18 rotatably mounted to the frame assembly 14, at least two hook members 20 mounted to the shaft 18, and a fixed extension member 22 mounted subjacent each of the hook members 20. It is also contemplated that the transport rack 12 of the present invention may be configured for securing the frame assembly 14 directly to the transport vehicle. This embodiment of the present invention would provide for a transport rack 12 having a frame assembly 14, a clamping assembly 16, and means for securing the frame assembly 14 to the transport vehicle.

Figure 8:
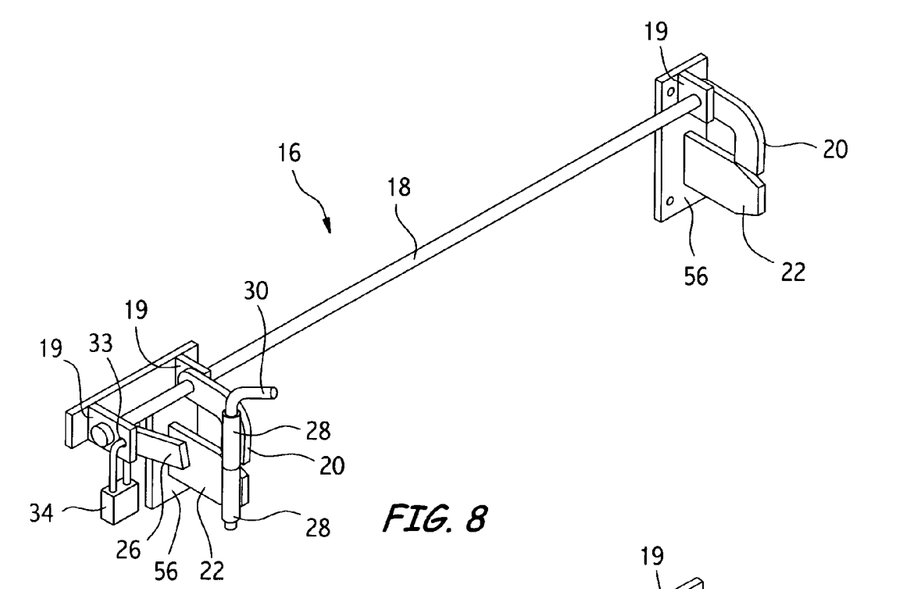
FIG. 8 is a perspective view of a clamping assembly of the present invention in a clamped position.
Figure 9:
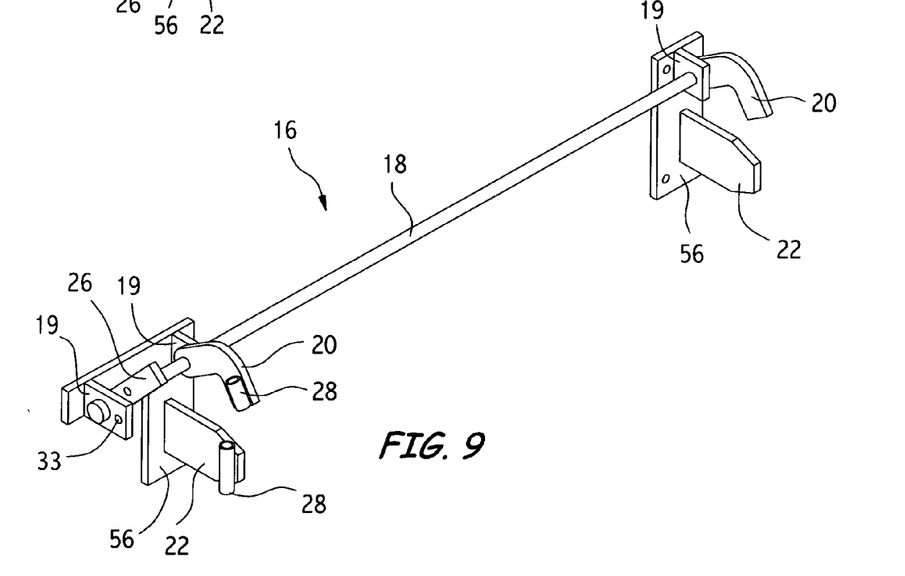
FIG. 9 is a perspective view of a clamping assembly of the present invention in an open position.
Figure 10:
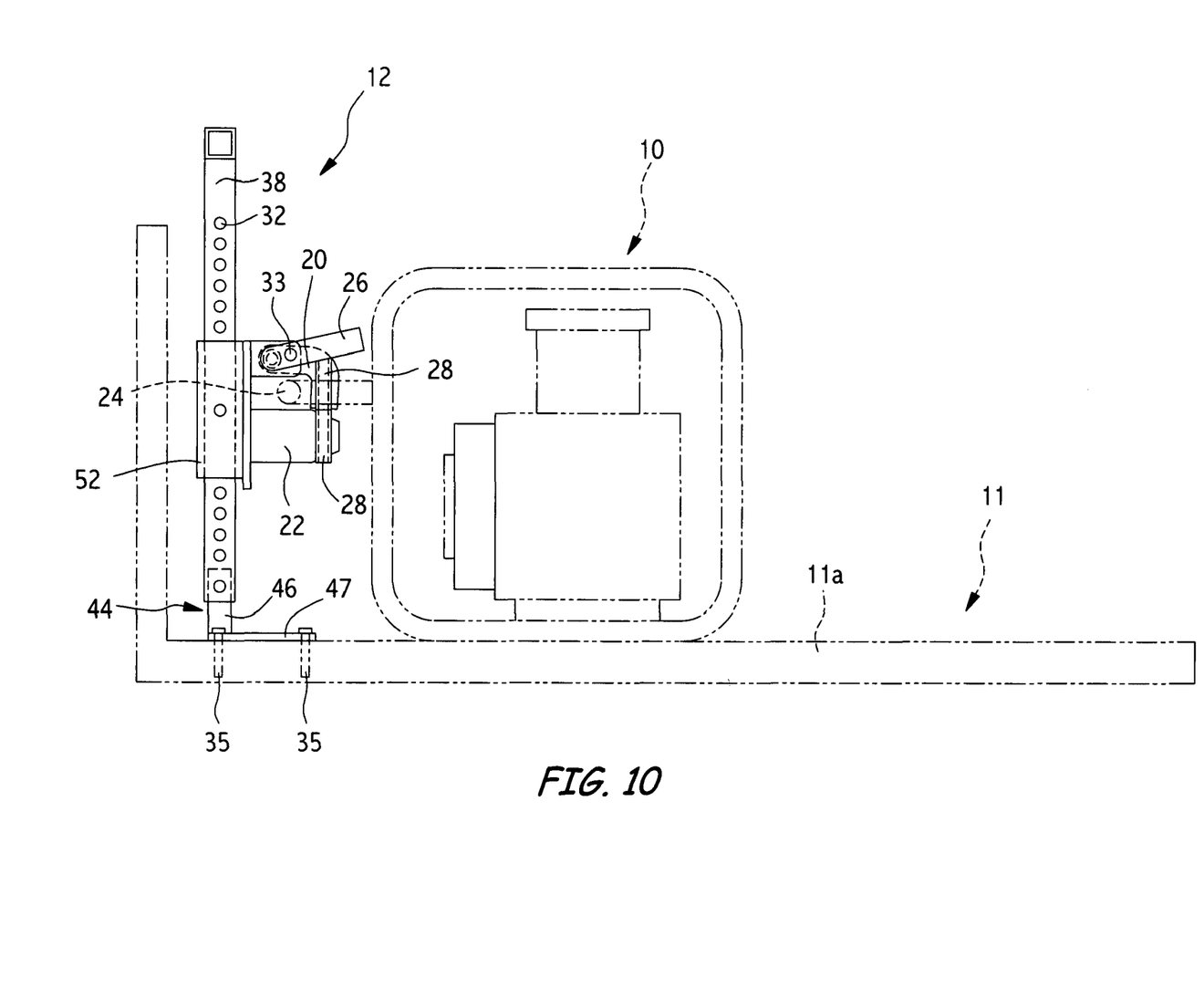
FIG. 10 a left side elevational view of the embodiment of the invention shown in FIG. 1 securing a portable generator.

The hook members 20 are mounted to the shaft 18 for rotation between a clamped position shown in FIG. 8, and an open position shown in FIG. 9. The hook members 20 and subjacent extension members 22 are adapted for securing a portion of the cargo 10 therebetween when the clamping assembly 16 is in the clamped position. Alternatively, where the cargo 10 is not adequately configured for engagement with the clamping assembly 16, the hook members 20 and subjacent extension members 22 may be adapted for securing a holding bar 24 when the clamping assembly 16 is in the clamped position. The holding bar 24 is itself fixedly attached to the cargo 10 and may be considered integral therewith. One embodiment of the transport rack 12 of the present invention being used to secure cargo 10 in the form of a portable generator is shown in FIG. 10; and an alternate embodiment of the present invention being used to secure cargo 10 in the form of an ATV is shown in FIG. 11.

Figure 3:
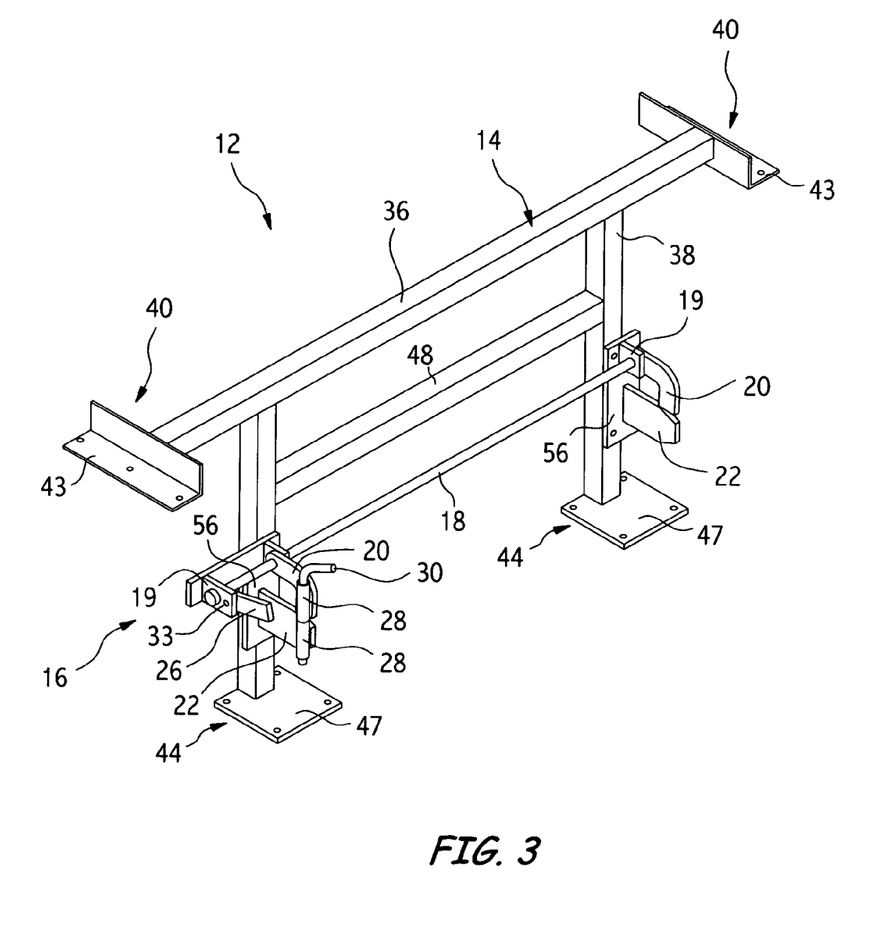
FIG. 3 is a perspective view of another embodiment of the invention.
Figure 11:
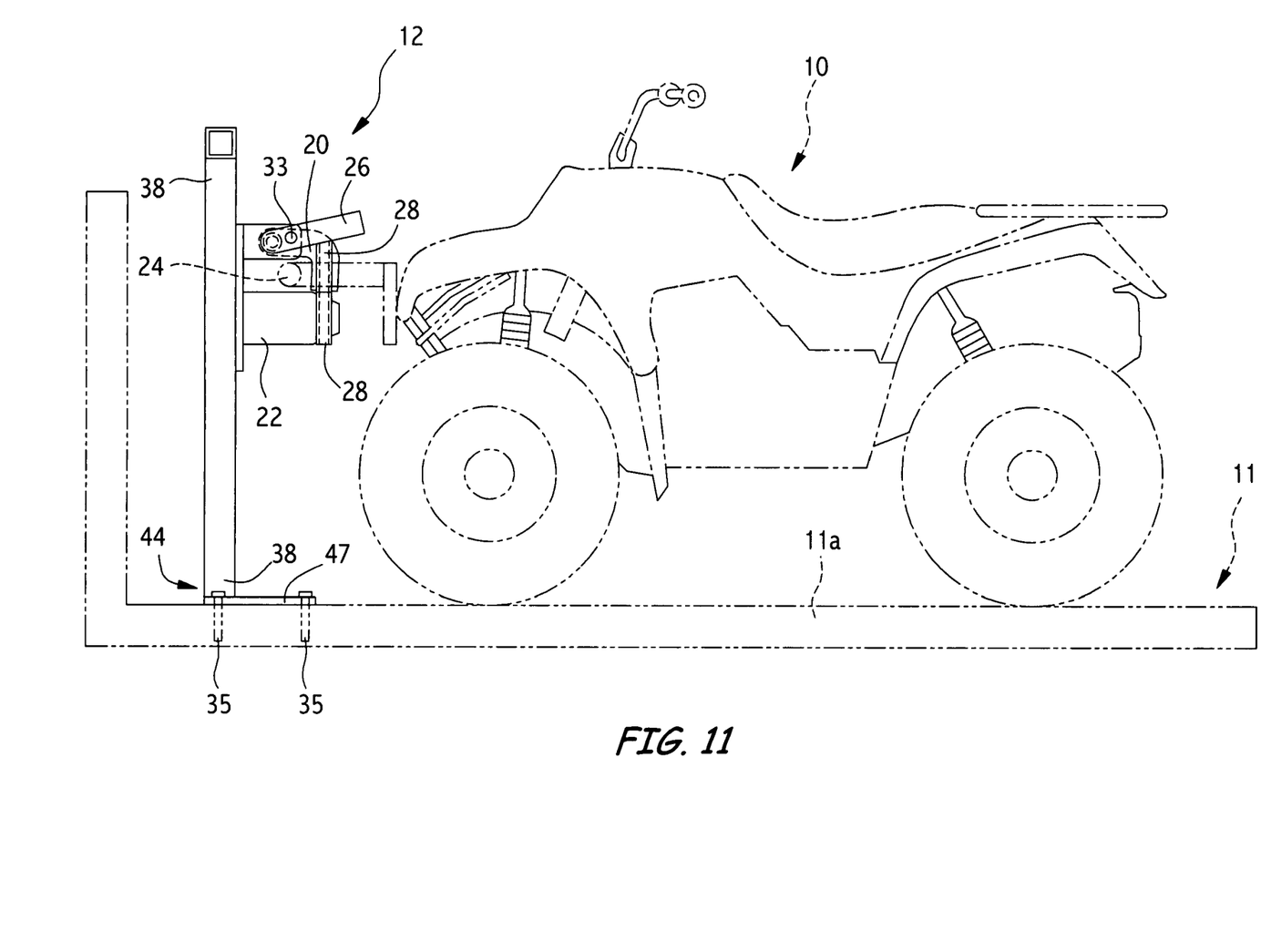
FIG. 11 is a left side elevational view of the embodiment of the invention shown in FIG. 3 securing an all terrain vehicle.

With reference to the embodiment of the present invention shown in FIGS. 3 and 11, it can be seen that the shaft 18 is rotatably mounted to the frame assembly 14 in a generally horizontal position. The clamping assembly 16 comprises a hand lever 26 operatively mounted to the shaft 18 for use in manually rotating the shaft 18 and the hook members 20 between an open position and a clamped position. The clamping assembly 16 further comprises opposing cylindrical sleeves 28, one of which is mounted on at least one of the hook members 20, and the other of which is mounted on the associated subjacent extension member 22. The opposing sleeves are positioned thereon to form an aligned channel 29, shown in FIG. 7, for receiving a pin 30 when the hook members 20 are in a clamped position.

Figure 5:
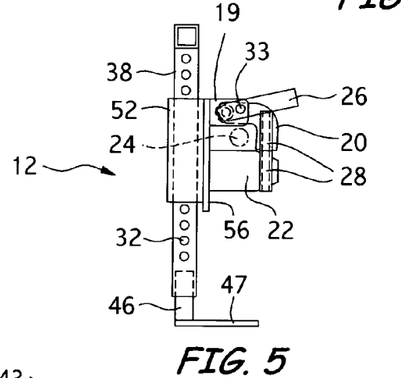
FIG. 5 is a left side elevational view of the embodiment of the invention shown in FIG. 1.
Figure 6:
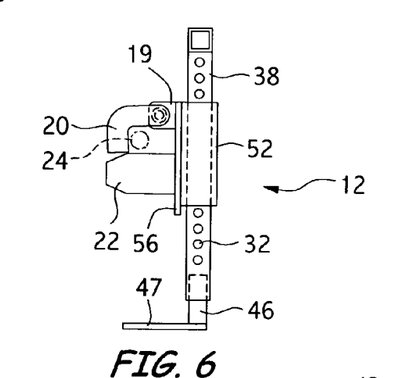
FIG. 6 is a right side elevational view of the embodiment of the invention shown in FIG. 1.
Figure 7:
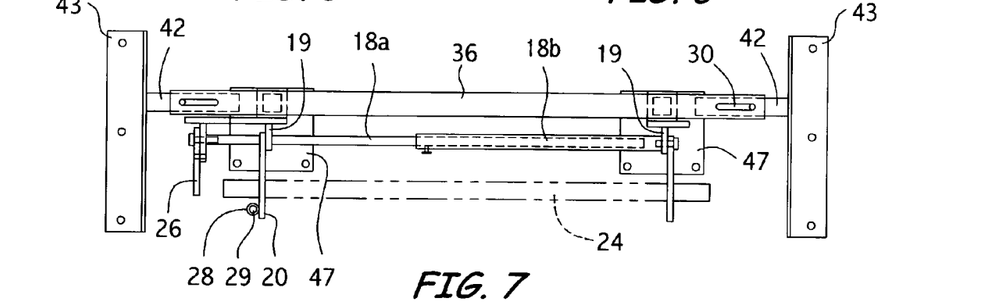
FIG. 7 is a top plan view of the embodiment of the invention shown in FIG. 1.

It can be appreciated that the present invention provides an apparatus for securing cargo that is easy to operate. Placing the clamping assembly 16 of the present invention in the clamped position as shown in FIGS. 5 and 6 secures cargo 10 to allow for its safe transportation on the bed 11 of a transport vehicle. To provide protection against theft of cargo 10 secured by the transport rack 12, and to maintain the present invention in the clamped position, the present invention further comprises means for locking the shaft 18 and hook members 20 of the clamping assembly 16 in a clamped position. In the preferred embodiment, the locking means comprising a padlock 34 passing through openings 33 in the hand lever 26 and a shaft end bracket 19 fixedly attached to the frame assembly 14. Alternate locking means are contemplated without departing from the scope of the present invention disclosed herein. It may be appreciated with reference to the drawings, and with specific reference to FIG. 8, that the openings 33 are aligned when the clamping assembly 16 is in a clamped position, which allows the padlock 34 to pass therethrough to lock the clamping assembly 16 in a clamped position.

In the embodiment of the present invention shown in FIGS. 3 and 11, the transport rack 12 comprises a frame assembly 14 having a rail member 36 and two vertical support members 38 extending downwardly from the rail member 36. The lower ends of the vertical support members 38 terminate in floor brackets 47 that are secured to the floor support surface 11a. As can be seen, this embodiment provides a transport rack 12 with a frame assembly 14 and clamping assembly 16 in a fixed position such as may be used with cargo 10 having a specific configuration.

Figure 4:
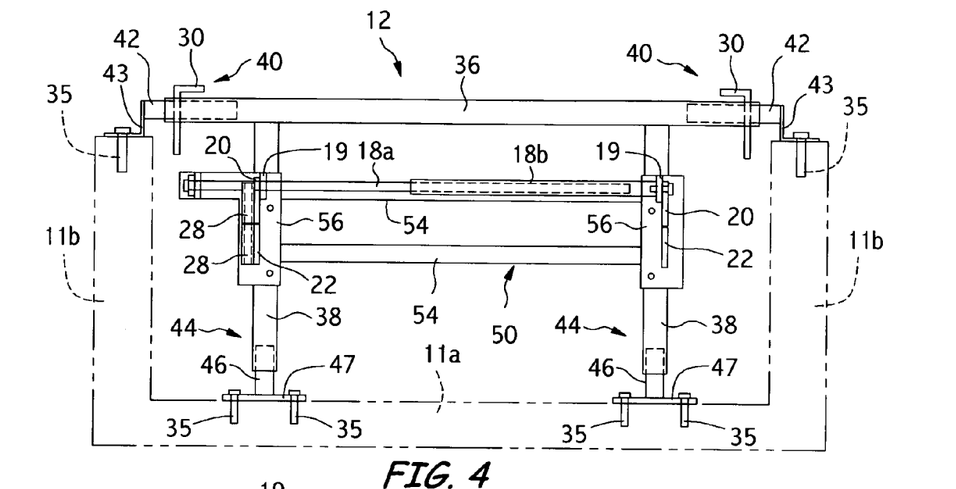
FIG. 4 is a front elevational view of the embodiment of the invention shown in FIG. 1.

The preferred embodiment of the present invention, which is shown in FIGS. 1, 2, 4-7, and 10, provides a transport rack 12 having a configuration that may be readily altered to allow the transport rack 12 to be used with cargos 10 and beds 11 of various shapes.

Where the bed 11 of a transport vehicle has opposing sidewalls 11b, the frame assembly 12 may be provided with a pair of arms 40 having distal ends adapted for connection to the sidewalls 11b. This may be in the form of a rail member 36 having opposing ends terminating in sidewall brackets 43 which are secured to the sidewalls 11b utilizing anchor bolts 35. The frame assembly may further comprise arms 40 that have telescoping arm members 42 terminating in sidewall brackets 43, such as arm members 42 extending from the opposing ends of the rail member 36 with distal ends secured to the sidewalls 11b as shown in FIG. 4. The telescoping arms provide means for selectively adjusting the width of the frame assembly 14, although alternate means are contemplated for adjusting the width of the frame assembly 14 without departing from the scope of the present invention. This allows the transport rack 12 of the present invention to be used with beds 11 of various configurations. The telescoping arm members 42 may be secured to the opposing arms 40 utilizing pins 30 passing through aligned apertures 32 formed therein. Alternatively, the telescoping arm members 42 may be secured to the opposing arms 40 utilizing set screws or other such securing means known in the art.

The frame assembly 12 may be provided with telescoping legs 44 having distal ends adapted for connection to the flooring surface 11a. This may be in the form of leg member 46 telescopically extending from a lower end of each of the vertical support members 38. In this case, the lower end of the leg members 46 terminates in floor brackets 47 that are secured to the support surface 11a utilizing anchor bolts 35. The telescoping legs provide means for selectively adjusting the height of the frame assembly 14, although alternate means are contemplated for adjusting the height of the frame assembly 14 without departing from the scope of the present invention. This allows the transport rack 12 of the present invention to be used with cargos 10 and beds 11 of various configurations. The telescoping leg members 46 may be secured to the vertical support members 38 utilizing elongated fasteners 31 passing through aligned apertures 32 formed therein.

The present invention may also comprise means for selectively changing the height of the clamping assembly 16 above the support surface 11a, being measured along a generally vertical line perpendicular to the support surface 11a. That is, the present invention may comprise means for selectively changing the height of the shaft 18, hook members 20, and extension members 22 above the support surface measured along a line perpendicular to the support surface 11a. One such means is the previously discussed telescoping legs 44, which allow for adjustment of the vertical position of the clamping assembly 16.

Figure 2:
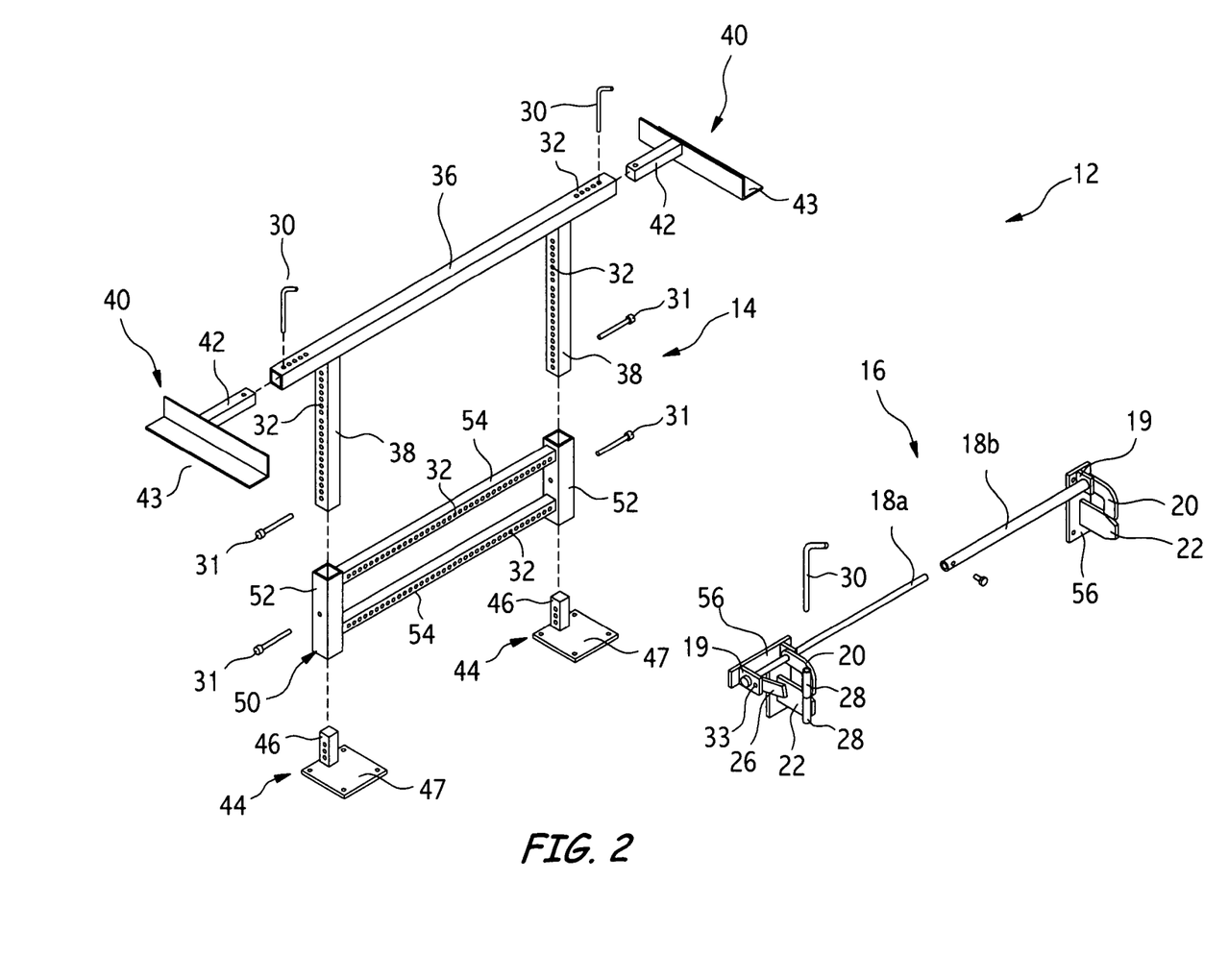
FIG. 2 is an exploded perspective view of the embodiment of the invention shown in FIG. 1.

An exploded view of the preferred embodiment is shown in FIG. 2, which illustrates a component of the present invention that provides an alternate means for changing the height of the clamping assembly 16. The frame assembly 14 of this embodiment comprises a collar 50 having a pair of outer tubes 52 slidably receiving the vertical support members 38. The collar 50 is also provided with a cross member 54 connecting the outer tubes 52. In this embodiment, the clamping assembly is mounted to the collar 50 and the means for selectively changing the height of the clamping assembly 16 comprises means for connecting the collar 50 to the vertical support members 38 at selective vertical positions relative thereto. Similar to the securement means for the telescoping leg members 46, the collar 50 may be secured to the vertical support members 38 utilizing elongated fasteners 31 passing through aligned apertures 32 formed therein. It can be appreciated that the vertical position of the clamping assembly 16 may be adjusted by slidably moving the collar 50 about the vertical support members 38. This allows the transport rack 12 of the present invention to be used with various cargos 10 which engage the clamping assembly 16 at different heights above the support surface 11a.

Another means of changing the height of the clamping assembly 16 is provided by an embodiment of the present invention wherein the clamping assembly 16 has a pair of mounting brackets 56. Each mounting bracket 56 has at least one extension member 22 mounted thereto, as well as one end of the shaft 18 rotatably mounted thereto. The present invention further comprises means for selectively positioning the mounting brackets 56. It can be appreciated that the vertical position of the clamping assembly 16 may be adjusted by connecting the mounting brackets 56 to the vertical support members 38 at selective vertical positions relative thereto. This provides another means for reconfiguring the transport rack 12 of the present invention to allow its use with cargos 10 that engage the clamping assembly 16 at differing heights above the support surface 11a. The means for selectively positioning the mounting brackets 56 further comprises, where such mounting brackets are secured to the collar 50, means for connecting the collar 50 to the vertical support members 38 at selective vertical positions relative thereto.

Figure 1:
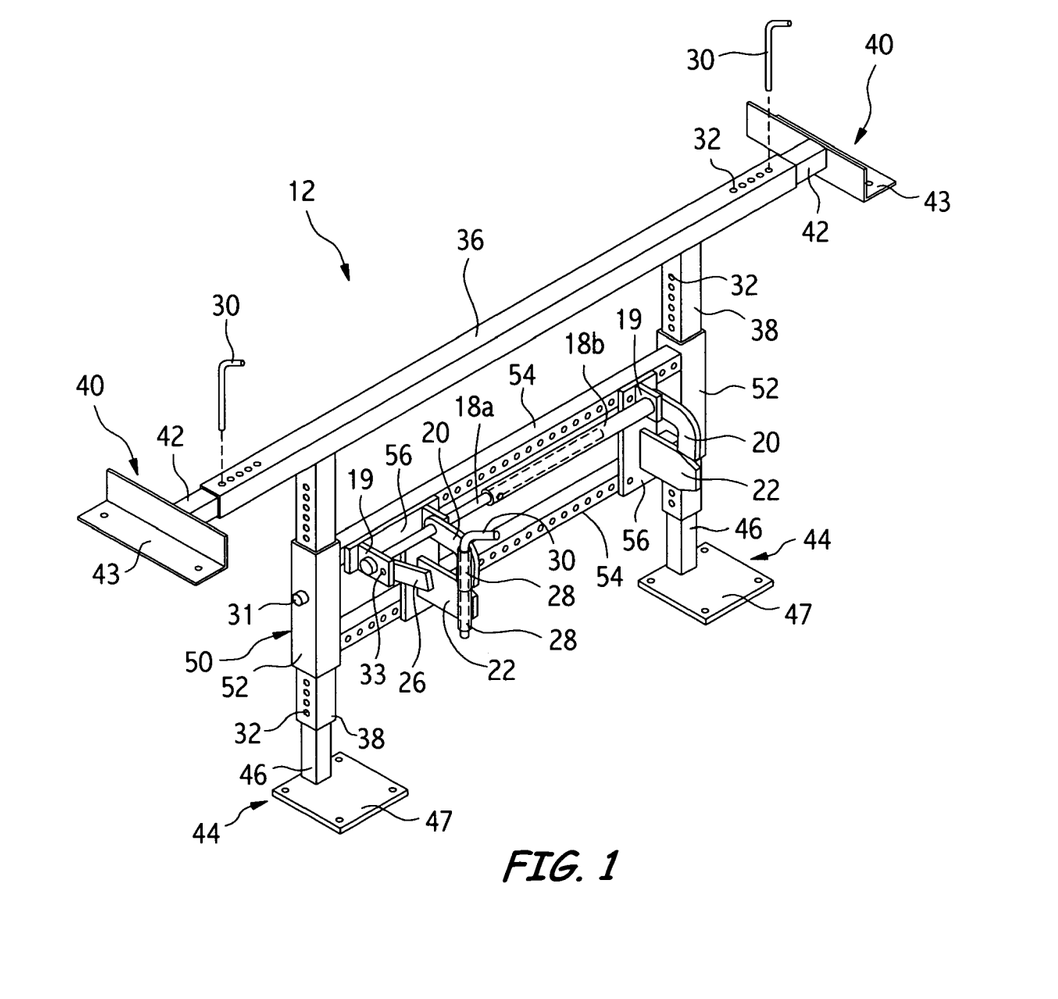
FIG. 1 is a perspective view of an embodiment of the invention.

The present invention further comprises means for selectively varying the distance between the hook members 20, where this distance is measured along a line centered about the shaft 18. This may be provided by a frame assembly 14 having a horizontal support member 48, such as shown in FIG. 3, wherein the means for selectively varying comprises means for attaching the mounting brackets 56 to the horizontal support member 48 at selective horizontal positions relative thereto. This may be further accomplished in conjunction with a shaft 18 having an adjustable length, including but not limited to a shaft 18 as shown in FIG. 1 having a first member 18a slidably engaging a second member 18b extending telescopically therefrom. It may be appreciated that attaching the mounting brackets 56 to the horizontal support member 48 at selective horizontal positions relative thereto provides an additional means for selectively positioning the mounting brackets 56. The mounting brackets 56 may similarly be attached to the cross member 54 of the collar 50 at selective horizontal positions relative thereto, providing additional means for selectively positioning.

It is to be understood that the form of the invention shown is a preferred embodiment thereof and that various changes and modifications may be made therein without departing from the spirit of the invention or scope as defined in the following claims.

What is claimed is:

1. A transport rack for a bed of a transport vehicle having a floor support surface, comprising:
   a) a frame assembly;
   b) a clamping assembly mounted to said frame assembly, said clamping assembly comprising a rotatable shaft, at least two hook members mounted to said shaft for rotation between an open position and a clamped position, and an extension member mounted subjacent each of said at least two hook members; and
   c) opposing cylindrical sleeves wherein one of said sleeves is mounted on at least one of said hook members, and the other said sleeve is mounted on said subjacent extension member, said opposing sleeves being positioned to form an aligned channel for receiving a pin when said hook members are in a clamped position.

2. A transport rack for a bed of a transport vehicle having a floor support surface, comprising:
   a) a frame assembly comprising at least two vertical support members and a collar comprising a pair of outer tubes slidably receiving said vertical support members and a cross member connecting said outer tubes;
   b) a clamping assembly mounted to said frame assembly, said clamping assembly comprising a rotatable shaft, at least two hook members mounted to said shaft for rotation between an open position and a clamped position, and an extension member mounted subjacent each of said at least two hook members; and
   c) means for selectively changing the height of said clamping assembly above the support surface, said height being measured along a generally vertical line perpendicular to the support surface,
   d) wherein said clamping assembly is mounted to said collar and said means for selectively changing comprises means for connecting said collar to said support members at selective vertical positions relative thereto.

3. A transport rack for a bed of a transport vehicle having a floor support surface and sidewalls, said transport rack comprising:
   a) a frame assembly having a lower end adapted for connection to the support surface and a pair of arms having distal ends adapted for connection to the sidewalls;
   b) a shaft rotatably mounted to said frame assembly in a generally horizontal position;
   c) at least two hook members mounted to said shaft;
   d) an extension member mounted to said frame assembly subjacent each of said at least two hook members; and e) opposing cylindrical sleeves, wherein one of said sleeves is mounted on at least one of said hook members, and the other said sleeve is mounted on said subjacent extension member, said opposing sleeves being positioned to form an aligned channel for receiving a pin when said hook members are in a clamped position.

4. A transport rack for a bed of a transport vehicle having a floor support surface, said transport rack comprising:
   a) a frame assembly having a lower end adapted for connection to the support surface and at least two vertical support members and a collar having a pair of mounting brackets secured thereto, said collar comprising a pair of outer tubes slidably receiving said vertical support members and a cross member connecting said outer tubes;
   b) a shaft rotatably mounted to said frame assembly in a generally horizontal position;
   c) at least two hook members mounted to said shaft;
   d) an extension member mounted to said frame assembly subjacent each of said at least two hook members; and
   e) means for selectively positioning said mounting brackets;
   f) wherein each said mounting bracket has at least one said extension member mounted thereto, and one end of said shaft rotatably mounted thereto, and wherein said means for selectively positioning comprises means for connecting said collar to said support members at selective vertical positions relative thereto.

5. A transport rack for a bed of a transport vehicle having a substantially horizontal support surface and opposing sidewalls, said transport rack comprising:
   a) a substantially horizontal support member having opposing distal ends, wherein each of said distal ends has a coupling member attached thereto for connection to an upper portion of a sidewall;
   b) a pair of substantially vertical support members each having an upper end mounted to said horizontal support member and a lower end having a coupling member attached thereto for connection to the support surface; and
   c) a clamping assembly mounted to said vertical support members between said horizontal support member and the lower ends of said vertical support members, said clamping assembly comprising a rotatable shaft, at least two upper extension members mounted to said shaft for rotation between an open position and a clamped position, and a lower extension member mounted subjacent each of said at least two upper extension members;
   d) wherein said horizontal support member and said vertical support members are coplanar.

6. A transport rack for a bed of a transport vehicle having a floor support surface and sidewalls, said transport rack comprising:
   a) a frame assembly having a lower end adapted for connection to the support surface and a pair of arms having distal ends adapted for connection to the sidewalls;
   b) a shaft rotatably mounted to said frame assembly in a generally horizontal position;
   c) at least two hook members mounted to said shaft;
   d) an extension member mounted to said frame assembly subjacent each of said at least two hook members; and
   e) a pair of mounting brackets, each said mounting bracket having at least one said extension member mounted thereto, and one end of said shaft rotatably mounted thereto.

7. A transport rack as described in claim 6 further comprising means for selectively positioning said mounting brackets.

8. A transport rack for a bed of a transport vehicle having a floor support surface, said transport rack comprising:
   a) a frame assembly having a lower end adapted for connection to the support surface and a horizontal support member;
   b) a shaft rotatably mounted to said frame assembly in a generally horizontal position;
   c) at least two hook members mounted to said shaft;
   d) an extension member mounted to said frame assembly subjacent each of said at least two hook members;
   e) a pair of mounting brackets, each said mounting bracket having at least one said extension member mounted thereto, and one end of said shaft rotatably mounted thereto; and
   f) means for selectively positioning said mounting brackets;
   g) wherein said means for selectively positioning comprises means for attaching said mounting brackets to said cross member at selective horizontal positions relative thereto.

9. A transport rack as described in claim 8 wherein said shaft comprises a first member slidably engaging a second member extending telescopically therefrom.

10. A transport rack for a bed of a transport vehicle having a substantially horizontal support surface and opposing sidewalls, said transport rack comprising:
    a) a frame assembly comprising at least two vertical support members and a collar comprising a pair of outer tubes slidably receiving said vertical support members and a cross member connecting said outer tubes;
    b) a clamping assembly mounted to said collar, said clamping assembly comprising a rotatable shaft, at least two upper extension members mounted to said shaft for rotation between an open position and a clamped position, and a lower extension member mounted subjacent each of said at least two upper extension members; and
    c) means for selectively changing the height of said clamping assembly above the support surface, said height being measured along a generally vertical line perpendicular to the support surface, wherein said means for selectively changing comprises means for connecting said collar to said vertical support members at selective vertical positions relative thereto.

11. A transport rack as described in claim 10 further comprising means for selectively varying the distance between said upper extension members, said distance being measured along a line centered about said shaft.

12. A transport rack as described in claim 11 wherein said shaft comprises a first member slidably engaging a second member extending telescopically therefrom.

13. A transport rack for a bed of a transport vehicle having a floor support surface and sidewalls, said transport rack comprising:
    a) a frame assembly having a lower end adapted for connection to the support surface and a pair of arms having distal ends adapted for connection to the sidewalls;

b) a shaft rotatable mounted to said frame assembly in a generally horizontal position;

c) at least two hook members mounted to said shaft;

d) an extension member mounted to said frame assembly subjacent each of said at least two hook members; and e) means for selectively varying the distance between said hook members, said distance being measured along a line centered about said shaft.

14. A transport rack as described in claim 13 further comprising a hand lever operatively mounted to said shaft for use in rotating said at least two hook members between an open position and a clamped position.

15. A transport rack as described in claim 13 wherein said pair of arms are telescoping.

16. A transport rack as described in claim 13 further comprising means for locking said shaft and said hook members in a clamped position.

17. A transport rack as described in claim 13 further comprising means for selectively changing the height of said shaft, said hook members, and said extension members above the support surface, said height being measured along a generally vertical line perpendicular to the support surface.

18. A transport rack for a bed of a transport vehicle having a floor support surface, comprising:

a) a frame assembly;

b) a clamping assembly mounted to said frame assembly, said clamping assembly comprising a rotatable shaft, at least two hook members mounted to said shaft for rotation between an open position and a clamped position, and an extension member mounted subjacent each of said at least two hook members; and c) means for selectively varying the distance between said hook members, said distance being measured along a line centered about said shaft.

19. A transport rack as described in claim 18 further comprising a hand lever mounted to said shaft for rotating said shaft.

20. A transport rack as described in claim 18 further comprising means for locking said clamping assembly in a clamped position.

21. A transport rack as described in claim 18 wherein said transport rack further comprising means for selectively changing the height of said clamping assembly above the support surface, said height being measured along a generally vertical line perpendicular to the support surface.

22. A transport rack as described in claim 18 wherein said frame assembly further comprises a horizontal support member and said clamping assembly further comprises a pair of mounting brackets, each said mounting bracket having at least one said extension member mounted thereto, and one end of said shaft rotatably mounted thereto, wherein said means for selectively varying comprises means for attaching said mounting brackets to said horizontal support member at selective horizontal positions relative thereto.

23. A transport rack as described in claim 22 wherein said shaft comprises a first member slidably engaging a second member extending telescopically therefrom.

24. A transport rack as described in claim 18 wherein said frame assembly further comprises at least two vertical support members, and a collar comprising a pair of outer tubes slidably receiving said vertical support members and a cross member connecting said outer tubes, said clamping assembly further comprising a pair of mounting brackets, each said mounting bracket having at least one said extension member mounted thereto, and one end of said shaft rotatably mounted thereto, wherein said means for selectively varying comprises means for attaching said mounting brackets to said cross member at selective horizontal positions relative thereto.

25. A transport rack as described in claim 24 wherein said shaft comprises a first member slidably engaging a second member extending telescopically therefrom.

* * * * *